United States Patent
Liu et al.

(10) Patent No.: US 10,670,939 B2
(45) Date of Patent: Jun. 2, 2020

(54) WAVELENGTH LOCKER

(71) Applicant: Elenion Technologies, LLC, New York, NY (US)

(72) Inventors: Yang Liu, Elmhurst, NY (US); Yangjin Ma, Brooklyn, NY (US); Ran Ding, New York, NY (US); Thomas Wetteland Baehr-Jones, Arcadia, CA (US); Saeed Fathololoumi, San Gabriel, CA (US); Kishore Padmaraju, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 195 days.

(21) Appl. No.: 15/855,242

(22) Filed: Dec. 27, 2017

(65) Prior Publication Data

US 2019/0196294 A1  Jun. 27, 2019

(51) Int. Cl.

| H04B 10/07 | (2013.01) |
| G02F 1/225 | (2006.01) |
| G02F 1/01 | (2006.01) |
| G01J 3/26 | (2006.01) |
| G01J 3/45 | (2006.01) |
| G01J 3/12 | (2006.01) |
| G02F 1/21 | (2006.01) |

(52) U.S. Cl.
CPC ............ *G02F 1/225* (2013.01); *G01J 3/26* (2013.01); *G01J 3/45* (2013.01); *G02F 1/0136* (2013.01); *H04B 10/07* (2013.01); *G01J 2003/1239* (2013.01); *G01J 2003/1247* (2013.01); *G02F 2001/212* (2013.01); *G02F 2203/18* (2013.01); *G02F 2203/50* (2013.01)

(58) Field of Classification Search
CPC ..................................................... H01S 5/0687
See application file for complete search history.

(56) References Cited

U.S. PATENT DOCUMENTS

| 6,782,017 B1 * | 8/2004 | Kai ................. H01S 5/0687 359/247 |
| 2003/0161631 A1 * | 8/2003 | Margalit ............. H04B 10/077 398/33 |
| 2014/0355979 A1 * | 12/2014 | Dorin ................ H04Q 11/0005 398/27 |
| 2018/0100967 A1 * | 4/2018 | Parker ................ G02B 6/12004 |
| 2019/0086272 A1 * | 3/2019 | Xia ........................ G01K 7/01 |

* cited by examiner

*Primary Examiner* — Thanh Luu
(74) *Attorney, Agent, or Firm* — Stratford Managers Corporation

(57) ABSTRACT

Conventionally, wavelength locking and monitoring has been achieved used various components, including calibrated etalon filters, gratings, and arrays of color filters, which offer fairly bulky solutions that require complicated controls. An improved on-chip wavelength monitor comprises: a combination comb filter comprising a plurality of comb filters, each for receiving a test beams, and each comb filter including a substantially different FSR, e.g. 10× to 20× the next closest FSR. A controller dithers a phase tuning section of each comb filter to generate a maximum or minimum output in a corresponding photodetector indicative of the wavelength of the test signal.

18 Claims, 5 Drawing Sheets

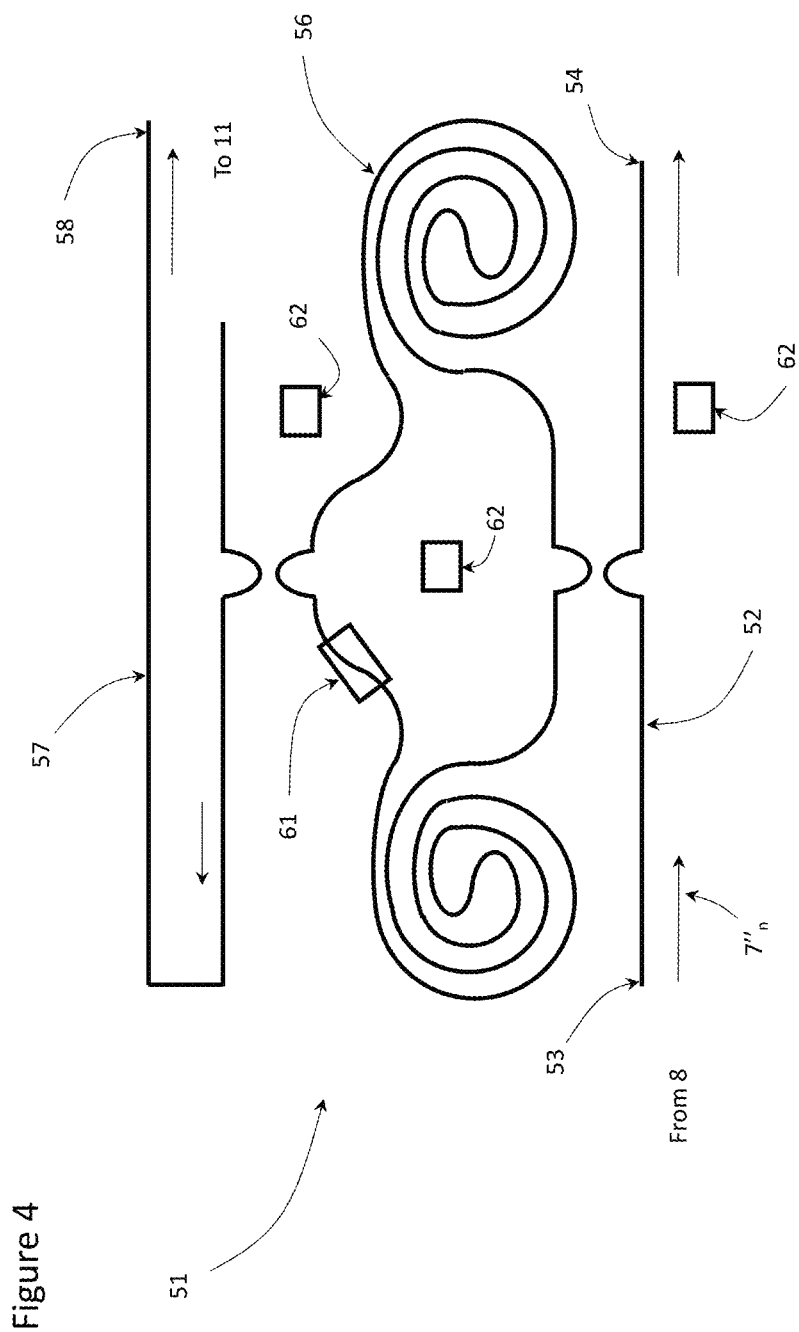

WAVELENGTH LOCKER

TECHNICAL FIELD

The present invention relates to a wavelength locker, and in particular to an integrated wavelength monitor and locker for use with photonic integrated circuits.

BACKGROUND

Accurately determining the absolute wavelength of a single mode laser signal has many potential applications in many fields, including spectroscopy, communication system, and wavelength tunable lasers. Conventionally, wavelength locking and monitoring has been achieved used various components, including calibrated etalon filters, gratings, and arrays of color filters. Unfortunately, all of the conventional systems offer fairly bulky solutions that require complicated controls and assembly. Furthermore, some of these devices reflect a significant amount of light back to the light source that can potentially disturb laser sources, which further necessitates the use of bulky isolators. Conventional wavelength lockers and monitors that provide fine resolutions, e.g. 1 GHz or 10 pm of accuracy, typically require large footprints.

An object of the present invention is to overcome the shortcomings of the prior art by providing an integrated wavelength locker with low reflectivity and high resolution.

SUMMARY OF THE INVENTION

Accordingly, the present invention relates to a wavelength monitor and measurement system comprising:

a splitter for splitting a test signal into a plurality of test beams;

a combination comb filter comprising a plurality of comb filters, each for receiving a respective one of the test beams, each comb filter including a different FSR;

at least one photodetector for measuring output from each comb filter;

a phase tuning section for each comb filter for tuning a resonance of each of the plurality of comb filters; and a controller for controlling the phase tuning section of each comb filter to generate a maximum or minimum output in the corresponding photodetector indicative of the wavelength of the test signal.

BRIEF DESCRIPTION OF THE DRAWINGS

The invention will be described in greater detail with reference to the accompanying drawings which represent preferred embodiments thereof, wherein:

FIG. 4 is a schematic diagram of an embodiment of a comb filter of the device of FIG. 1;

DETAILED DESCRIPTION

Figure 1:
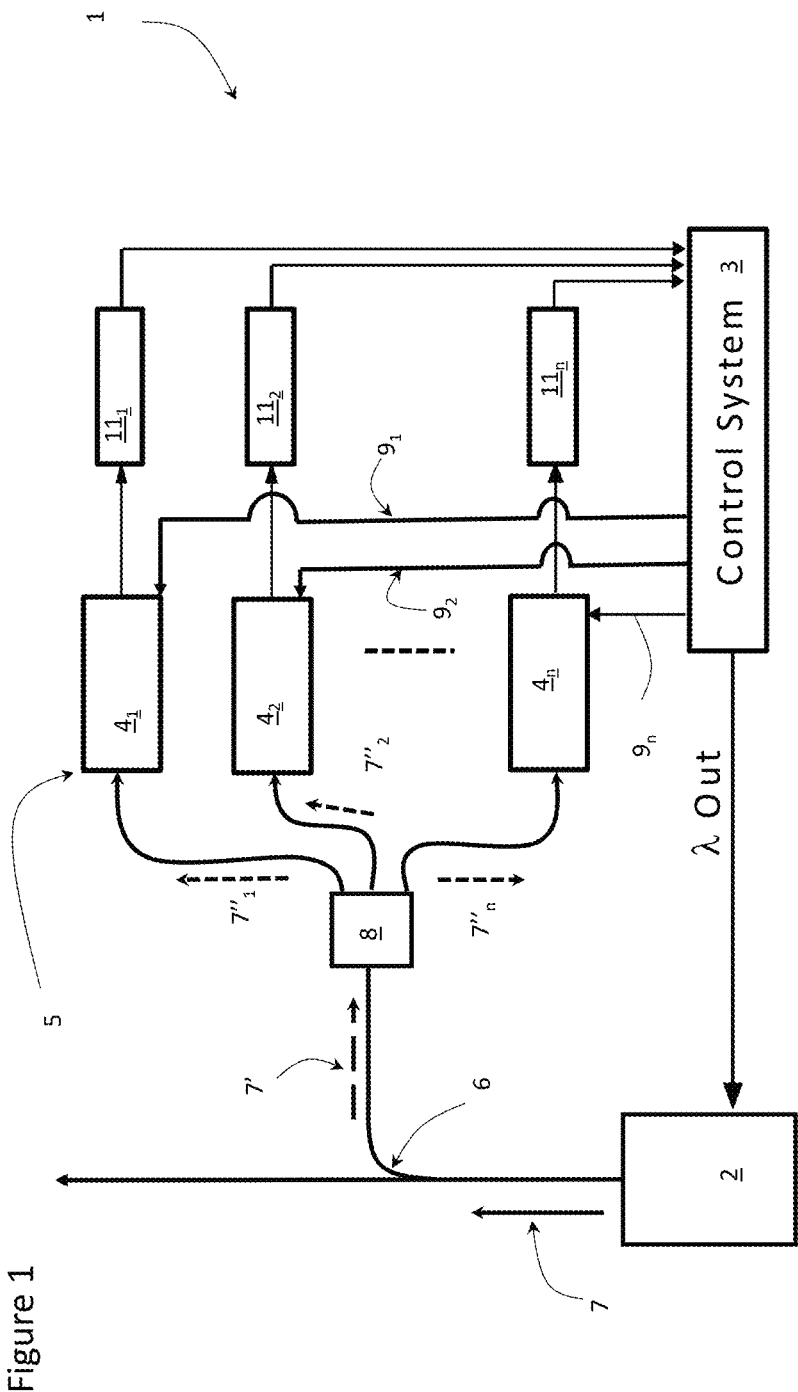
FIG. 1 is an schematic diagram of a wavelength locker/monitor in accordance with an embodiment of the present invention.

While the present teachings are described in conjunction with various embodiments and examples, it is not intended that the present teachings be limited to such embodiments. On the contrary, the present teachings encompass various alternatives and equivalents, as will be appreciated by those of skill in the art.

An embodiment of the present invention, relates to a novel compact on-chip wavelength locker (WLL) 1 based on integrated components to determine absolute wavelength of incoming light from a laser source 2 with minimum back reflection, high accuracy and stable temperature performance. The purpose of the WLL 1 is specifically to monitor and identify, with great accuracy, the wavelength of an incoming laser signal 7. One possible use for the WLL system 1 is to enable the laser source 2 to be tuned by control system 3 to a very precise wavelength, since now there is a means of seeing the current wavelength of the laser 2. The WLL 1 would be most suitable for different classes of tunable lasers 2, including integrated InP based photonic integrated circuits, hybrid III/V, and Silicon Photonic devices.

With reference to FIG. 1, the WLL 1 may use integrated components on a device layer of an independent photonic integrated circuit (PIC), an existing PIC including the laser source 2 or an independent PIC connected to a separate chip including the laser source 2. The WLL 1 may comprise a tunable, periodic, high-fineness, combination comb filter 5 in wavelength space, which may include a plurality of separate comb filters $4.sub.1$ to $4.sub.n$, each with a different free spectral range (FSR). A tap 6 may be used to tap off a small portion, e.g. less than 5%, typically 1% to 5%, of the light 7 from the laser source 2 forming a test signal 7' to be fed to the WLL 1. A splitter 8 divides the test signal 7' into individual test beams $7''_1$ to $7''_n$, each for transmission to a respective one of the comb filters $4.sub.1$ to $4.sub.n$.

During operation, the control system 3 tunes each comb filter $4_1$ to $4_n$ by dithering a phase shifter, and locking each individual test beam $7''_1$ to $7''_n$ to a high fineness peak or a null point of the respective comb filter $4_1$ to $4_n$. Once the comb filter $4_1$ to $4_n$ is locked, the value of a pre-calibrated electrical signal used to tune the comb filters $4_1$ to $4_n$ is used by the controller 3 to determine the absolute wavelength of the test signal 7'.

To lock each comb filter $4_1$ to $4_n$, the control system 3 tunes the phase of each comb filter $4_1$ to $4_n$ using control signals $9_1$ to $9_n$ to maximize or minimize a current generated in a corresponding photodetector $11_1$ to $11_n$ depending on whether a null point or a peak point of the comb filter $4_1$ to $4_n$ is found, i.e. maximum transmission or minimum transmission of light through the comb filter $4_1$ to $4_n$.

Figure 2:
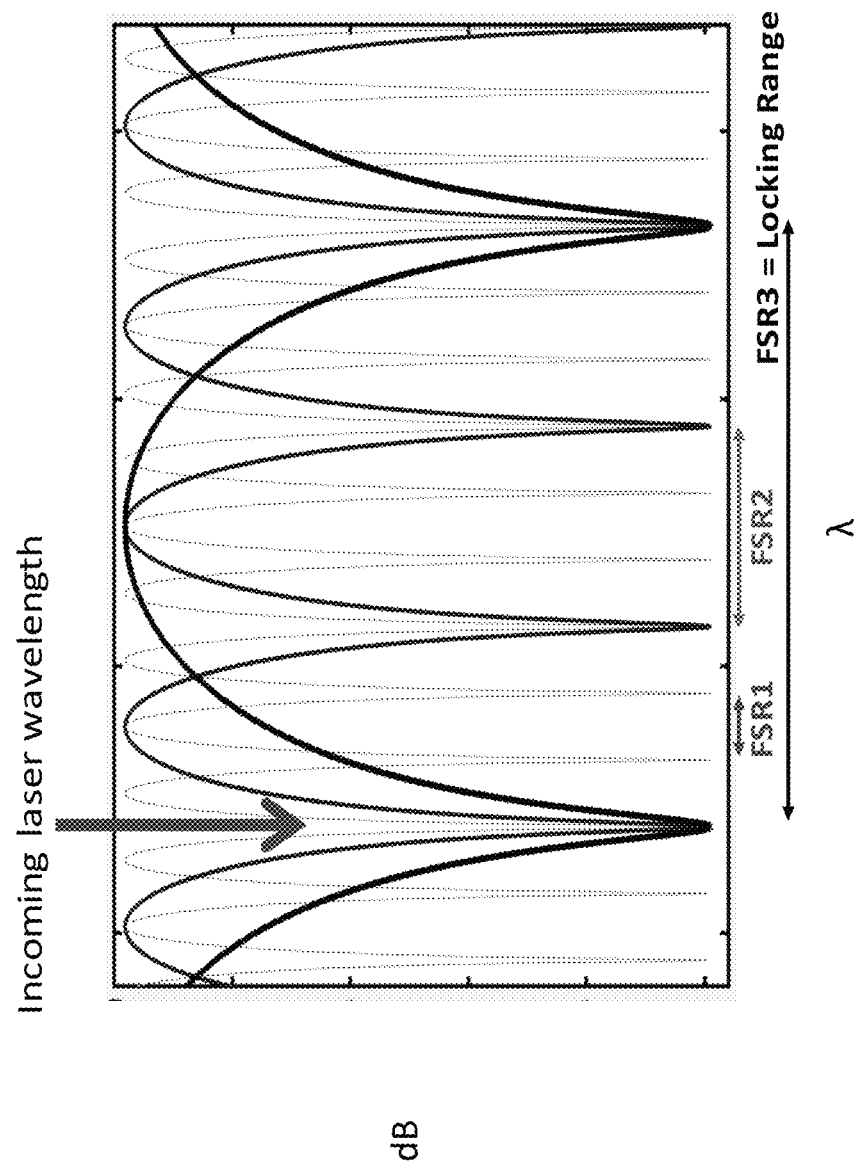
FIG. 2 is a plot of the response vs wavelength of the combined comb filter device of FIG. 1.

In the example plot illustrated in FIG. 2, three comb filters are utilized, i.e. a first comb filter $4_1$ with a first fine FSR1, e.g. 10 GHz to 40 GHz, ideally 20 GHz, an second comb filter 42 with a second intermediate FSR2, e.g. 100 GHz to 800 GHz, ideally 400 GHz, and a third comb filter 43 with a third coarse FSR3, e.g. 2000 GHz to 16000 GHz, ideally 8000 GHz. Additional comb filters with additional intermediate FSR's may be used. For this example, the WLL 1 is tuned whereby all of the combs align at a null point to the incoming light wavelength. Accordingly, the wavelength range of the comb filter 5 is defined as the FSR of the coarsest comb FSR3.

Based on this method and depending on the accuracy of electronics, wavelength accuracy as small as a fraction of the smallest FSR may be achieved. The fraction is as many phase levels as the electronics can detect within each $2\pi$ range. Hence each phase section needs to be tuned for a full $2\pi$. Obviously electronics with lower phase noise will be able to detect finer phases. For instance, it is possible to achieve wavelength accuracy at least 10 to 30 times, preferably 20 times, finer than the FSR, e.g. achieving 18° phase accuracy.

In order to maximize the wavelength range of WLL 1, the illustrated embodiment uses multiple filters, e.g. 4$_1$ to 4$_3$, with different values of FSRs, e.g. FSR1, FSR2 and FSR3, respectively. The finest filter 4$_1$ detects as many wavelength values within one FSR as phase levels, e.g. 20 times in the example mentioned above. The second filter 4$_2$ may consequently have an FSR that is equal to or larger than fine filter 4$_1$ by as much as the detectable phase levels. For the quoted example, the second FSR2 may be 10 to 30 times, preferably 20 times, larger than the fine FSR1, resulting in a detection wavelength range as large as 400 times the wavelength resolution. This scheme may be repeated as many time as possible with as many comb filters 4$_1$ to 4$_n$ as possible to cover the wavelength range of interest. The final WL range will be the FSR FSRn of the coarsest comb filter 4$_n$.

The controller 3 may actuate and control the combined comb filter 5 continuously throughout the life of the device, i.e. analog control, utilizing some form of feedback loop. Alternatively, the controller 3 may actuate and control the combined filter 5 whenever a wavelength enquiry is made, e.g. according to a predetermined timing protocol, such as upon start up, and/or at predetermined time periods During use, the controller 3 may actuate and control all of the filters 4$_1$ to 4$_n$ simultaneously. For example: each filter will determine the wavelength of the test beam 7'$_1$-7'$_n$ within the filters given accuracy and resolution. Then based on phase bias (electrical) readings of each filter 4$_1$ to 4$_n$, the controller 3 calculates the precise wavelength of the test signal 7'. Alternatively, the controller 3 may tune the coarsest filter 4$_n$, e.g. FSR3, first to determine the wavelength of the test beam 7'$_n$ within a first broad range, e.g. 400 GHz for an FSR3 of 8000 GHz and 20 phase levels. Then, knowing the first broad range, the controller 3 many tune one or more intermediate filters 42 to determine the wavelength of the test beam 7'$_2$ within a second intermediate range within the first broad range, e.g. 20 GHz for an FSR2 of 400 GHz and 20 phase levels. Finally, knowing the intermediate range, the controller 3, tunes the finest filter 4$_1$ to determine the wavelength of the test beam 7'$_1$ to within a fine range within the intermediate range, e.g. 1 GHz for an FSR3 of 20 GHz and 20 phase levels.

The on-chip comb filters 4$_1$ to 4$_n$ may be implemented using, inter alia, unbalanced Mach-Zehnders (MZ) filter 30 (FIG. 3), and/or coiled racetrack resonators 51 (FIG. 4).

Figure 3:
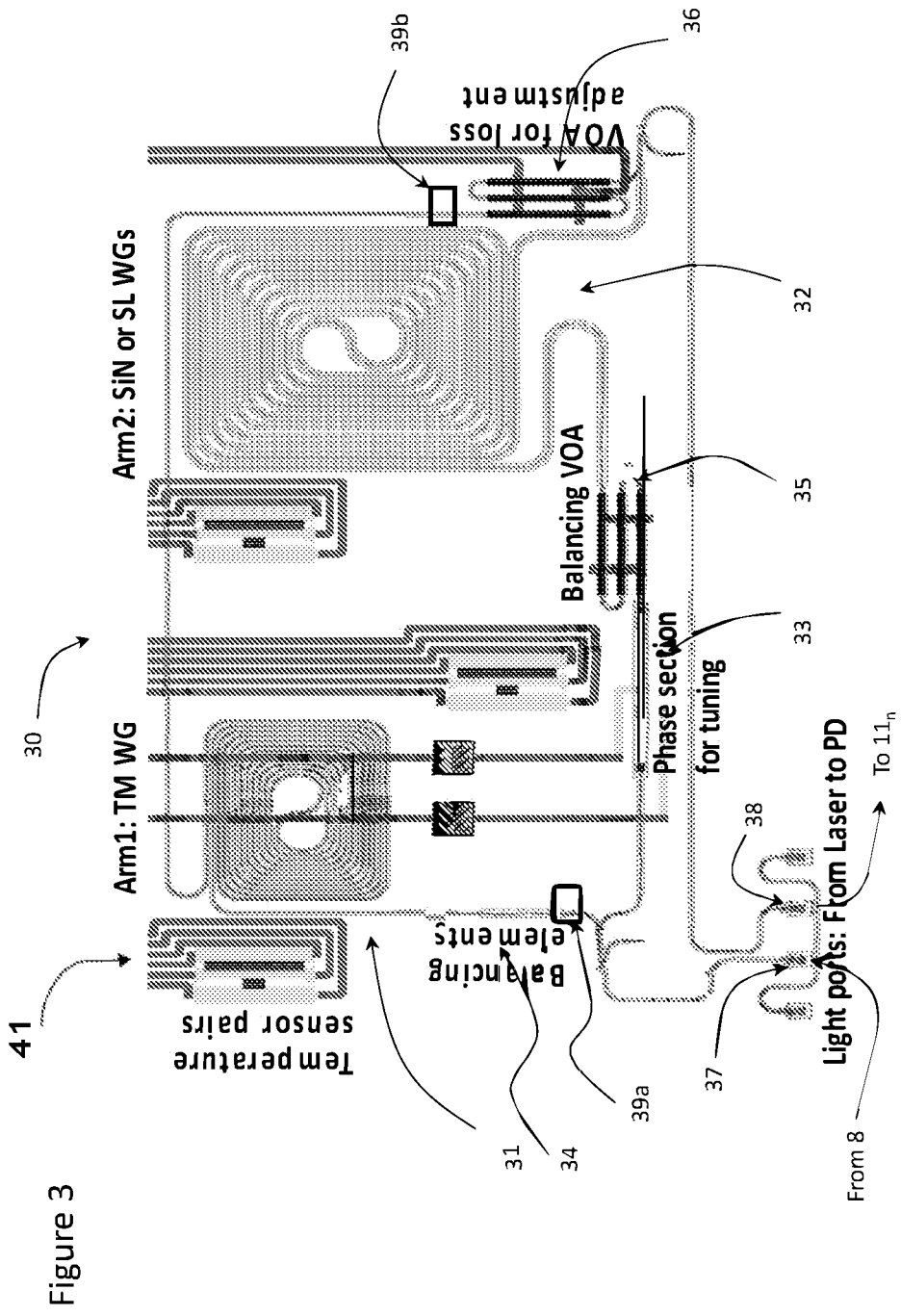
FIG. 3 is a schematic diagram of an embodiment of a comb filter of the device of FIG. 1.

With reference to FIG. 3, a MZ filter 30, comprised of a first arm 31 and a second arm 32, with an arm length imbalance, e.g. the longer arm may be 10%-90%, 20%-80%, 30%-50% longer or any suitable imbalance, and a small loss imbalance, may provide high fineness combs 4$_1$ to 4$_n$. The wavelength of the test signals 7"$_1$ to 7"$_n$ may be determined at the null or max points of the MZ filter 30. The phase of the MZ filter 30 may be tuned by the control system 3 by including a phase tuning section 33, e.g. a thermal phase tuner, on either of the arms 31 or 32. In an illustrated example, an FSR of 16 GHz is provided, and 16 distinct phase levels may be identified within each FSR. Hence a wavelength resolution of 1 GHz is achieved.

In order to actively balance the losses between each of the first and second arms 31 and 32, a variable optical attenuator 35 may be provide in one or both of the first and second arms 31 and 32. In order to more passively balance losses between each of the first and second arms, due to components found in either of the first and second arms 31 and 32, a balancing element may be provided in each arm 31 and 32 of the MZ filter 30. For example, a balancing element 34 may be provided on the first arm 31 for tuning the loss of arm 31 by including similar components, e.g. transitions between different waveguide materials, that are found in the second arm 32. Moreover, a second variable optical attenuator (VOA) 36 may be provided on the first arm 32 to balance the losses caused by the first VOA 34 in the first arm 31. The test signal 7"$_n$ enters the input port 37 from the splitter 8, and exits the output port 38 to the corresponding photodetector 11$_n$.

The MZ filter 30 may be constructed to have minimum thermal cross talk between the phase tuning section 33 and the rest of the MZ waveguides 31 and 32. Accordingly, the first and second arms 31 and 32 may each include a coiled section, disposed as far away, e.g. >500 µm, from any heat source, e.g. the phase tuning section 33, as possible, to minimize the thermal gradient across each arm. The biggest advantage of MZ filters 30 is that they are not reflective by nature and hence no isolator will be needed for the integrated tunable laser 2. The type of waveguide, e.g. shape and/or material, on each arm may be constructed to reduce temperature sensitivity of the filter response and device back reflection. In order to have smaller temperature sensitivity, waveguides with different properties and/or types may be used for the first and second arms 31 and 32 in the same MZ filter 30 that further boosts the sensitivity.

The following equation (1) may be used to calculate the FSR of each MZ filter 30, and the following equation (2) may be used to calculate the temperature sensitivity Δλ/ΔT, i.e. change in wavelength per change in temperature for the MZ filter 30, wherein $n_g$ is the group index, $n_1$ and $n_2$ are the index of refraction for the first and second arms 31 and 32, respectively, and $L_1$ and $L_2$ are the lengths of the first and second arms 31 and 32, respectively.

$$FSR = \frac{\lambda^2}{n_{g1}L_1 - n_{g2}L_2} \quad (1)$$

$$FSR = \frac{\lambda^2}{n_{g1}L_1 - n_{g2}L_2}$$

$$\frac{\Delta\lambda}{\Delta T} = \frac{\frac{\partial n_1}{\partial T}L_1 - \frac{\partial n_2}{\partial T}L_2}{n_{g1}L_1 - n_{g2}L_2} \quad (2)$$

Accordingly, to minimize the temperature sensitivity, the numerator of equation (2) should be minimized, whereby the change in index with temperature×the length of the first arm 31 should be substantially equal to the change in index with temperature×the length of the second arm 32. There are several different ways in which to balance this equation, including but not limited to, fabricating the first and second arms 31 and 32 out of different materials, e.g. Silicon (Si) and Silicon Nitride (SiN). The shape, i.e. cross-section, of the first and second arms 31 and 32 may also be different to provide a different change in index with temperature, and therefore minimal temperature sensitivity. For example: one of the first and second arms 31 and 31 may comprise a rectangular or ridge cross-section with first height and width dimensions, while the other arm may comprise a rectangular or ridge cross-section with at least one of second different height and a second different width. In another example the cross-section of the first and second arms 31 and 32 may have different shapes, e.g. one of the first and second arms 31 and 32 may include a rectangular cross section (strip), while the other includes a ridge or rib waveguide cross-section, comprising a stepped or inverted T structure, with a slab portion and a ridge portion. In another possible embodiment, the light in one of the first and second arms 31 and 32 may be rotated from the usual mode, e.g. TE, to the orthogonal mode, e.g. TM, using a first polarization rotator 39a at the beginning of the first arm, and then rotated back to the original polarization, e.g. TE, by a second polarization rotator 39b, at the end of the first arm 31 Different modes may be used because the derivative of $n_{eff}$ with respect to temperature is significantly different for the TM mode as compared to the TE mode In an example embodiment, a first comb filter $4_1$ comprises an $FSR_1$ of 16 GHz at 1545 nm, and a length $L_1$ of a first TE0 waveguide 31 of 27.137 mm and a length $L_2$ of a second TM0 waveguide 32 of 38.103 mm. A second comb filter $4_2$ comprises an $FSR_2$ of 160 GHz at 1545 nm, and a length $L_1$ of a first TE0 waveguide 31 of 2.7137 mm and a length $L_2$ of a second TM0 waveguide 32 of 3.8103 mm. The plot below of $d\lambda/dT$ in µm/K vs Wavelength in µm illustrates that a typical MZ filter 30 with similar first and second waveguides 31 and 32 has a consistently large change in wavelength per change in temperature, whereas a thermally balanced MZ filter 30 has a much smaller temperature sensitivity, especially in the C-band (1.53 µm-1.565 µm), hence it requires looser temperature control.

Alternatively, or in combination with the aforementioned thermally balanced waveguides, in order to more accurately compensate for thermal effects on the MZ filter 30, a plurality of temperature sensors 41, e.g. two to four, ideally three, may be used to map the temperature of the WLL 1. In order to make interpolation within the sensors 41 more accurate, the heat source, e.g. phase section 33, is placed outside of the area defined by the sensors 41, e.g. three sensors 41 define a triangle, four sensors 41 define a quadrilateral. Each temperature sensor 41 may comprise two diodes, each with a different length in order to make differential detection and achieve higher reading accuracy. Further accuracy is achieved by using four-point-detection scheme on each diode. From the temperature readings of the plurality of sensors 41, a temperature profile of the MZ filter 30 may be determined by the control system 3. Based on the temperature profile, the control system 3 may then compensate for the thermal effects by adjusting the peaks of the comb filters $4_1$ to $4_n$, i.e. the ultimate wavelength reading of the test signals $7''_1$ to $7''_n$.

With reference to FIG. 4, a ring resonator 51 may also be used to achieve the high fineness spectral response required for the comb filters $4_1$ to $4_n$ in the WLL 1. Conventional ring or multi-ring resonators may be used, but the illustrated embodiment includes a coiled racetrack resonator 51, to minimize area and thermal effects. The coiled racetrack resonator 51 includes an input waveguide 52 with an input port 53 and a through port 54. At least one closed loop waveguide 56 is coupled to the input waveguide 52. An output waveguide 57 is coupled to an opposite side of the loop waveguide 56, and includes drop port 58, which is optically coupled to one of the photodetectors $11_1$ to $11_n$. When light of the resonant wavelength is passed through the loop waveguide 56 from the input waveguide 52, it builds up in intensity over multiple round-trips due to constructive interference and is output to the output waveguide 57, which serves as a detector waveguide. Because only a select few wavelengths will be at resonance within the loop waveguide 56, the optical ring resonator 51 functions as a filter.

For resonance to take place in the ring resonator 51, the following resonant condition must be satisfied:

$$\lambda_m = 2\pi r n_{eff}/m$$

Wherein r is the radius of the ring resonator and net is the effective index of refraction of the waveguide material making up the ring resonator 51.

Where $\lambda_m$ is the resonant wavelength, and m is the mode number of the ring resonator 51. Accordingly, in order for light to interfere constructively inside the ring resonator 51, the circumference of the closed loop 56 must be an integer multiple of the wavelength of the light. As such, the mode number must be a positive integer for resonance to take place. As a result, when the incident light contains multiple wavelengths, only the resonant wavelengths will be able to pass through the ring resonator 51 fully. As a result, when the wavelength of the test beam $7''_n$ matches the resonant wavelength of the ring resonator 51, a maximum transmission measurement will be detected by the photodetector $11_n$, whereby the value of a pre-calibrated electrical signal used to tune the ring resonator 51 is used by the controller 3 to determine the absolute wavelength of the test signal $7''_n$.

Similar to the MZ filter 20 above, the ring resonator 51 includes at least one phase tuning section 61, e.g. thermo-optic or electro-optic, within the closed loop 56 to enable the aforementioned tunability. The phase tuning section 61 also should include waveguides with low back reflection and small thermal coefficient. The ring resonator 51 may also be comprised of waveguides 52, 56 and 57 that result in minimal thermal effects. For example: if combination of positive and negative thermal coefficient waveguides are used. One advantage of the ring resonator devices 51 over the MZ filter 20 based devices is that the resonator device 51 may be accessed both via the through port 54 and the drop port 58, which provides different signal amplitudes at high fineness section. For example, providing the photodetector $11_n$ or an additional photodetector optically coupled to the through port 54 may provide an indication of when light from the test signal $7''_n$ at the resonant wavelength of the ring resonator 51 is minimized or null at the through port 54, and therefore fully passed to the drop port 58. Accordingly, the through port 54 may provide an alternative location for the photodetector $11_n$ or a secondary location for an additional photodetector providing a secondary or confirmation measurement that the ring resonator 51 is locked to the wavelength of the laser signal 7.

As mentioned above with reference to the MZ filter 20, the ring resonator device 51 may also be temperature sensitive. Despite constructing the waveguides 52, 56 and 57, of materials to minimize thermal effects, the absolute wavelength of the high fineness point may slightly change with temperature, resulting in reading error. Accordingly, as with the MZ filter 20, a few on-chip temperature sensing devices 62 may be used around each ring resonator 51 to closely monitor and control its temperature. The polygon formed by temperature sensing devices 62 should contain no heat sources to allow for thermal interpolation anywhere inside such shape. Each temperature sensor 62 may comprise two diodes, each with a different length in order to make differential detection and achieve higher reading accuracy. Further accuracy is achieved by using four-point-detection scheme on each diode. From the temperature readings of the plurality of sensors 62, a temperature profile of the ring resonator filter 51 may be determined by the control system 3. Based on the temperature profile, the control system 3 may then compensate for the thermal effects by adjusting the peaks of the comb filters $4_1$ to $4_n$, i.e. the ultimate wavelength reading of the test signals $7''_1$ to $7''_n$.

Each filter device, e.g. MZ filter 30 or ring resonator 51, requires calibration to define the precise location of comb filter lines depending on the measured temperatures, as well as the applied current to the phase tuning section 33 or 61. This calibration data is used to calculate the absolute wavelength based on the phase shifter bias and temperature for which the filter, e.g. MZ filter 30 or ring resonator 51, is locked to the test signal $7''_1$ to $7''_n$.

Figure 5A:
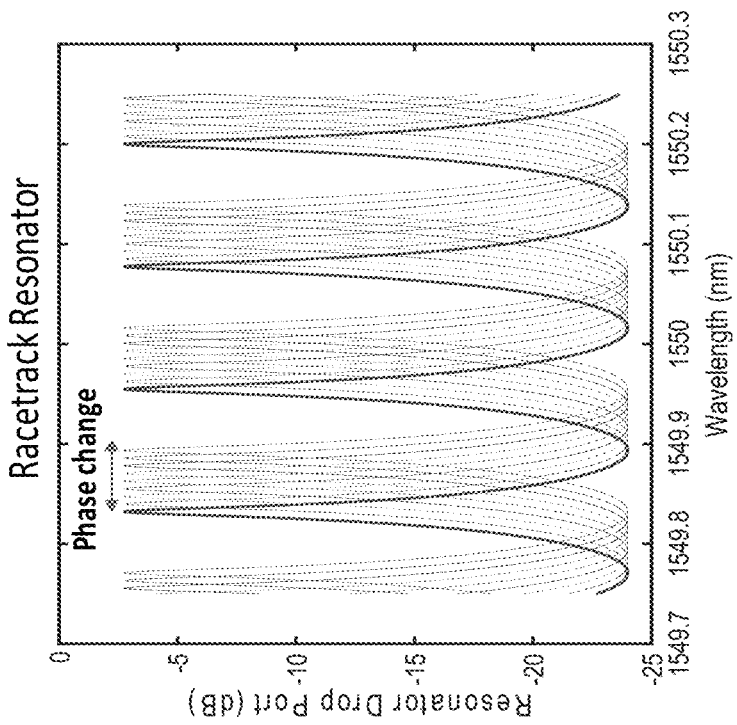
FIG. 5a a plot of the response vs wavelength of the device of FIG. 3 for various phase shifts.
Figure 5B:
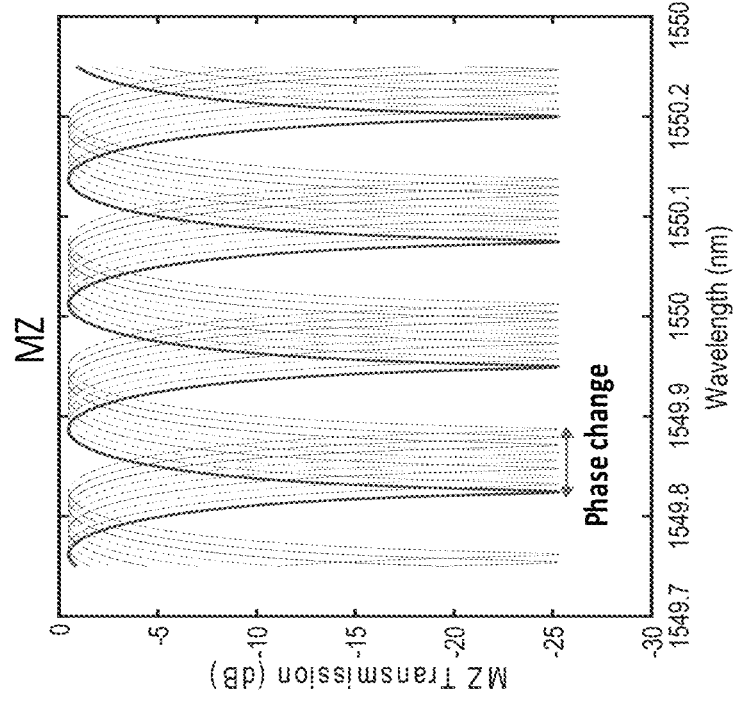
FIG. 5b a plot of the response vs wavelength of the device of FIG. 4 for various phase shifts.

FIG. 5a is an example of a fine comb filter response for different phase shifts based on the MZ filter 40, and FIG. 5b is an example of a fine comb filter response for different phase shifts based on the coiled racetrack resonator 51. As the phase tuning section 33 or 61 is adjusted by the controller 3, the null point (or peak point) of the response shifts. The control system 3 determines the wavelength of the test signal 7', and may lock the WLL 1 to either peak or null points on both designs. The control system 3 may then send laser control signals back to the laser source 2 to provide adjustments to the wavelength, i.e. control the wavelength of the tunable laser 2.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A wavelength monitor comprising:
   a laser source for generating a laser signal;
   a tap for tapping a portion of the laser signal forming a test signal;
   a splitter for splitting the test signal into a plurality of test beams;
   a combination comb filter comprising a plurality of comb filters, each for receiving a respective one of the test beams, each comb filter including a different FSR, the plurality of comb filters comprising a first filter comprising a first FSR and a first largest detection wavelength range, a second filter comprising a second FSR and a second intermediate detection wavelength range, and a third filter comprising a third FSR and a third smallest detection wavelength range;
   at least one photodetector for measuring output from each comb filter;
   a phase tuning section for each comb filter for tuning each of the plurality of comb filters; and
   a controller for controlling the phase tuning section of each comb filter to generate a maximum or minimum output in a corresponding one of the least one photodetector indicative of a wavelength of the test signal;
   wherein the controller is configured to tune the first filter to determine that the wavelength of the test signal is within the first largest detection wavelength range; tune the second filter to determine that the wavelength of the test signal is within the second intermediate detection wavelength range within the first largest detection wavelength range; and tune the third filter to determine that the wavelength of the test signal is within the third smallest detection wavelength range within the second intermediate detection wavelength range; and
   wherein the controller is configured to determine the wavelength of the test signal using values of pre-calibrated electrical signals used by each phase tuning section to tune each of the plurality of comb filters; and
   wherein the controller is configured to tune the laser source based on the wavelength of the test signal.

2. The wavelength monitor according to claim 1, wherein each comb filter comprises a Mach-Zehnder interferometer.

3. The wavelength monitor according to claim 2, wherein each Mach-Zehnder interferometer comprises first and second arms comprised of different materials, thereby substantially balancing a first change in refractive index with temperature x a length of the first arm with a change in refractive index with temperature x a length of the second arm to mitigate a thermal second imbalance between the first and second arms.

4. The wavelength monitor according to claim 3, wherein the first arm comprises Silicon and the second arm comprises Silicon Nitride.

5. The wavelength monitor according to claim 2, wherein each Mach-Zehnder interferometer comprises first and second arms; and wherein the first arm includes a different shape than the second arm, thereby substantially balancing a first change in refractive index with temperature×a length of the first arm with a second change in refractive index with temperature×a length of the second arm to mitigate a thermal imbalance between the first and second arms.

6. The wavelength monitor according to claim 5, wherein the first arm includes a strip waveguide, and the second arm comprises a rib waveguide.

7. The wavelength monitor according to claim 5, wherein the first arm includes a width that is wider than a width of the second arm.

8. The wavelength monitor according to claim 2, wherein each Mach-Zehnder interferometer comprises first and second arms; and wherein the first arm includes a first polarization rotator proximate a beginning thereof for rotating a polarization of light in the first arm to different than light in the second arm, and a second polarization rotator proximate an end thereof for rotating the polarization of the light in the first arm to the same as the light in the second arm, thereby substantially balancing a first change in refractive index with temperature×a length of the first arm with a second change in refractive index with temperature×a length of the second arm to mitigate a thermal imbalance between the first and second arms.

9. The wavelength monitor according to claim 1, wherein each comb filter comprise a ring resonator.

10. The wavelength monitor according to claim 9, wherein each ring resonator comprises a drop port and a through port; and wherein one of the at least one photodetector is coupled to each drop port to determine when a wavelength of the test beam corresponds to a resonant wavelength of the ring resonator and thereby substantially passes through to the photodetector coupled to the drop port.

11. The wavelength monitor according to claim 10, wherein another one of the at least one photodetector is coupled to each through port to determine when a wavelength of the test beam corresponds to the resonant wavelength of the ring resonator and thereby does not substantially pass through to the photodetector coupled to the through port.

12. The wavelength monitor according to claim 9, wherein each ring resonator comprises waveguides with positive and negative thermal coefficients on each side thereof to mitigate a thermal imbalance between each side.

13. The wavelength monitor according to claim 1,
   wherein the second FSR of the second filter is at least 10 times larger than the first FSR of the first filter; and
   wherein the third FSR of the third filter is at least 10 times larger than the second FSR of the second filter.

14. The wavelength monitor according to claim 13, wherein the first FSR of the first filter is between 10 GHz to 40 GHz;

wherein the second FSR of the second filter is between 100 GHz to 800 GHz; and wherein the third FSR of the third filter is between 1000 GHz to 16000 GHz.

15. The wavelength monitor according to claim 13, wherein the phase tuning section of the first filter provides wavelength accuracy of at least 10 to 30 times finer than the first FSR of the first filter.

16. The wavelength monitor according to claim 1, further comprising a temperature sensor for compensating for thermal effects on the plurality of comb filters.

17. The wavelength monitor according to claim 16, wherein the temperature sensor comprises at least three temperature sensors.

18. The wavelength monitor according to claim 17, wherein each temperature sensor comprises two diodes with different lengths in order to make differential detection and achieve higher reading accuracy.

* * * * *